(12) United States Patent
Fortmann et al.

(10) Patent No.: US 9,581,139 B2
(45) Date of Patent: Feb. 28, 2017

(54) VOLTAGE CONTROL FOR WIND TURBINES

(71) Applicant: SENVION SE, Hamburg (DE)

(72) Inventors: Jens Fortmann, Berlin (DE); Vincenz Dinkhauser, Fockbek (DE)

(73) Assignee: SENVION SE, Hamburg (DE)

( * ) Notice: Subject to any disclaimer, the term of this patent is extended or adjusted under 35 U.S.C. 154(b) by 0 days.

(21) Appl. No.: 14/419,465

(22) PCT Filed: Aug. 2, 2013

(86) PCT No.: PCT/EP2013/066292
§ 371 (c)(1),
(2) Date: Feb. 3, 2015

(87) PCT Pub. No.: WO2014/020157
PCT Pub. Date: Feb. 6, 2014

(65) Prior Publication Data
US 2015/0184640 A1    Jul. 2, 2015

(30) Foreign Application Priority Data

Aug. 3, 2012   (DE) .................. 10 2012 213 830

(51) Int. Cl.
*F03D 9/00* (2016.01)
*F03D 7/02* (2006.01)
(Continued)

(52) U.S. Cl.
CPC .............. *F03D 9/005* (2013.01); *F03D 7/00* (2013.01); *F03D 7/028* (2013.01); *F03D 7/042* (2013.01);
(Continued)

(58) Field of Classification Search
CPC . F03D 5/02; F03D 9/005; F03D 9/003; F03D 7/042; F03D 7/028; F03D 7/00;
(Continued)

(56) References Cited

U.S. PATENT DOCUMENTS 7,531,911 B2    5/2009   Rivas et al.
2004/0178639 A1  9/2004   Wobben
(Continued)

FOREIGN PATENT DOCUMENTS

DE    102004048339    4/2006
DE    102004060943    7/2006
(Continued)

OTHER PUBLICATIONS

International Search Report and Written Opinion mailed Apr. 14, 2014, directed towards International Application No. PCT/EP2013/066292, 13 pages.
(Continued)

*Primary Examiner* — Julio Gonzalez Ramirez
(74) *Attorney, Agent, or Firm* — Morrison & Foerster LLP (57) ABSTRACT

A wind turbine having a rotor, a generator driven by the rotor, a converter, a control device having an input for a control signal for reactive power output and a controller for the converter, the controller determining a reactive power target value for the wind turbine and correcting the output reactive power in dependence on the voltage present at the wind turbine, and an additional module for the controller having separate small and large signal paths and interacting with the controller such that the small signal path has an additional storage element in comparison with the large signal path, which additional storage element stores state values of the small signal path for the past. Thus, small voltage changes can be reacted to more slowly and while taking into account past values, whereas large changes can be reacted to quickly, in particular in the event of a network short circuit.

22 Claims, 4 Drawing Sheets

(51) Int. Cl.
*F03D 7/04* (2006.01)
*H02J 3/38* (2006.01)
*F03D 7/00* (2006.01)
*H02P 9/30* (2006.01)
*H02J 3/16* (2006.01)

(52) U.S. Cl.
CPC .............. *F03D 9/003* (2013.01); *H02J 3/386* (2013.01); *H02P 9/305* (2013.01); *H02J 3/16* (2013.01); *Y02E 10/723* (2013.01); *Y02E 10/763* (2013.01); *Y02E 40/34* (2013.01)

(58) Field of Classification Search
CPC ...... H01J 3/24; H01J 3/28; H01J 3/386; H01J 3/16; H02P 9/105; H02P 9/305; Y10T 307/718
USPC ....... 290/44, 55; 700/286, 287, 288; 307/84; 415/1; 416/1
See application file for complete search history.

(56) References Cited

U.S. PATENT DOCUMENTS

| | | |
|---|---|---|
| 2008/0088129 A1 | 4/2008 | Altemark et al. |
| 2008/0157533 A1 | 7/2008 | Flottemesch et al. |
| 2008/0265577 A1* | 10/2008 | Fortmann ............... F03D 7/028 290/44 |
| 2010/0134076 A1* | 6/2010 | Cardinal ................... G05F 1/70 323/207 |
| 2010/0157638 A1* | 6/2010 | Naiknaware ........ H02M 7/4807 363/131 |
| 2013/0175870 A1 | 7/2013 | Fortmann |

FOREIGN PATENT DOCUMENTS

| | | |
|---|---|---|
| EP | 1386078 | 2/2004 |
| EP | 1643609 | 4/2006 |
| EP | 1643609 A2 * | 4/2006 |
| WO | WO-2005/091490 | 9/2005 |
| WO | WO-2012/089675 | 7/2012 |
| WO | WO 2012/089675 A2 * | 7/2012 |

OTHER PUBLICATIONS

International Preliminary Report on Patentability issued Feb. 3, 2015, directed towards International Application No. PCT/EP2013/066292, 12 pages.

* cited by examiner

VOLTAGE CONTROL FOR WIND TURBINES

REFERENCES TO RELATED APPLICATIONS

This application is a national stage application under USC 371 of International Application No. PCT/EP2013/066292, filed Aug. 2, 2013, which claims priority to German Patent Application No. 10 2012 213 830.7, filed Aug. 3, 2012.

FIELD OF THE INVENTION

The invention relates to a wind turbine comprising a rotor, a generator driven thereby having a converter and a control device, which has an input for a control signal for the reactive power output and a regulator for the converter, which regulator preferably has a voltage regulator and is designed to regulate the reactive power output on the basis of the control signal.

BACKGROUND OF THE INVENTION

In order to ensure a high degree of stability and grid quality in the supply and transmission grids for electrical energy, grid operators are to an increasing extent demanding support from energy generators. This relates not only to conventional power plants, but to an increasing extent also to wind turbines or wind farms consisting of a plurality of wind turbines. In principle, it is the case that wind farms are connected to the grid via so-called tap-changing transformers in precisely the same way as conventional power plants. Tap-changing transformers are transformers which are provided with a tap changer for matching to a changing voltage level on the grid. Since switchover of the tap changer results in change in voltage, conventional power plants respond with a short-term change in the reactive power output, to be precise owing to the synchronous generators typically used in said power plants and the specific characteristics of the said synchronous generators. In general, such a reactive power output is definitely desirable in the case of a real change in voltage, but not when it is merely a switchover operation of the tap-changing transformer. This problem with the undesired output of reactive power as a result of switching operations at the tap changer is prevalent to an increased extent in the case of wind turbines since wind turbines or wind farms consisting of a plurality of wind turbines are typically connected to the grid via a tap changer which is tapped more coarsely in comparison with a tap changer of a conventional power plant.

Relevant grid operator guidelines make provision for the fact that the reactive power output of wind turbines takes place with a dead band. In this case, a dead band is understood to mean a tolerance range for the voltage around the rated value for the voltage. Since wind turbines do not have the reactive power output behavior of conventional power plants which has an intrinsically stabilizing effect owing to the type of generator construction typically used in wind turbines, the application of the dead band can result in an undesired reduction in the voltage stability.

SUMMARY OF THE INVENTION

An object of the invention is to provide improved regulation which avoids the mentioned disadvantages.

This can be achieved by a wind turbine and the features as broadly disclosed herein. Advantageous developments are disclosed in the detailed embodiments below.

In the case of a wind turbine comprising a rotor, a generator driven thereby having a converter and a control device, which has an input for a control signal for the reactive power output and a regulator for the converter, which regulator is preferably a voltage regulator and is designed to calculate, locally, a reactive power setpoint value for the wind turbine from the control signal for the reactive power output, to detect the actually output voltage of the wind turbine and to correct the reactive power output by the wind turbine after comparison with the control signal, in accordance with the invention an additional module for the regulator is provided, which additional module has separate small-signal and large-signal signal paths and interacts with the regulator in such a way that the small-signal signal path has an additional storage element in comparison with the large-signal signal path, which additional storage element stores state values of the small-signal signal path for the past.

The storage element may be in particular a delay element, a filter, preferably a filter with an infinite impulse response (IIR filter), a ramp or a preferably autoregressive (AR) moving-average (MA or ARMA) generator.

The invention is based on the knowledge that the switchover operations performed in the regulation operating mode which have led to problems in respect of the reactive power infeed in the case of previous procedure with tap-changing transformers can be attributed to small changes in the voltage. In this case, i.e. in the case of a small change in the voltage, in accordance with the invention only a slow change in the reactive power takes place. Therefore, even very slow (creeping) changes in voltage can be taken into consideration. On the other hand, relatively large changes in the voltage are to be expected when there are abrupt processes on the grid, in particular in connection with a grid short circuit; in this case, a quick response is required. The large-signal signal path is generally free from storage elements and can therefore always respond quickly to changes.

An aspect of the invention therefore consists in the concept that, in the case of large changes in the voltage there should be a quick response and in the case of small changes in the voltage there should rather be a slow response, also taking into consideration state values from the past. The invention therefore implements a transformation from the amplitude plane (for the magnitude of the voltage deviation) into the time plane (for the speed of the change in voltage and the response thereto). In accordance with the invention, therefore, the small-signal signals are not considered in absolute terms (i.e. unconnected with the preceding values) but against the background of the respective past values. Therefore, the invention provides for the arrangement of a storage element in the small-signal signal path, which storage element takes into consideration the past values. In practice, this may be in particular a delay element, such as is known per se from regulation technology, a filter, in particular a low-pass filter or a ramp function element or an average generator.

Therefore, thanks to the invention, there is a response to small changes in voltage with what tends to be a slow change in reactive power. The undesired behavior in accordance with the prior art, in accordance with which even small sudden changes in voltage such as occur on actuation of a tap changer, for example, bring about strong changes in the reactive power output, is therefore effectively avoided. Nevertheless, the rapid response capability for supporting the grid in the event of a short circuit, wherein there is indeed a large change in voltage within a very short time, is still fully maintained. The invention therefore combines two aims which originally appear to be contradictory.

Preferably, the large-signal signal path has a dead band element. The dead band element makes it possible in a particularly efficient manner to effectively draw a distinction between a small change (in the case of which dead band element does not provide any response at its output) and a large change, in the case of which the large-signal signal path is then connected.

Further preferably, a tracking module is provided in the large-signal signal path, which tracking module interacts with the dead band element. Said tracking module is designed to track the average of the dead band element. This means that the dead band element itself is free of an average, to be precise even when the voltage changes in the long term (i.e. even in the case of so-called creeping changes in voltage). In addition, therefore, a changed voltage level is taken into consideration, as a result, for example, of the switching of a tap-changing transformer or tap changer. The tracking module ensures that, even in the case of a voltage level which has changed in such a way, the dead band element is so to speak in the center of its range and therefore departs from the desired margin both upwards towards a relatively high voltage and downwards towards a relatively low voltage. A preferred embodiment of the tracking module is connected upstream of the dead band element. Expediently, said tracking module has a high time constant, with the result that only long-term changes are detected. Preferred for this is a time constant which is at least an order of magnitude (10 times), further preferably at least 50 times, greater than a time constant that the small-signal signal path has functionally.

Expediently, the additional module is connected upstream of the regulator. In this case, two preferred connection alternatives can be selected, without the intention being for other connection alternatives to be ruled out. The first alternative consists in connection to an input for an actual value of the regulator. This may be in particular the input at which a signal for a deviation of the actual voltage at the wind turbine from a value for the setpoint voltage is applied. Therefore, a rapid response can be achieved since the additional module is therefore active directly at the input of the regulator. The second alternative consists in connecting the additional module to an output of the regulator. In this variant, the additional module acts on an output variable of the regulator, for example a manipulated variable. Hereby a smoother behavior of the additional module at the regulator can be achieved which is less inclined towards sudden changes or fluctuations.

Expediently, a rate limitation element is provided in the small-signal signal path. This has the effect that the possible rate of rise of the storage element likewise arranged in the small-signal signal path is limited. Hereby, it is possible to avoid a "drift" of the storage element even in the case of unfavorable past values, similar to the function of an "anti-windup" in the case of an integrator. Therefore the stability of the regulation is also improved in the case of large signal changes. Particularly reliable is an embodiment in which the rate limitation element is embodied in combination with the storage element, in particular in its embodiment as a delay element. This enables very efficient implementation. In order to avoid sudden changes in the reactive power output, in particular in the case of or after a departure from the dead band, a voltage filter can be provided for initialization at the storage element and/or the rate limitation element. Therefore, zeroing takes place in the case of a return to the dead band.

Preferably, switchover logic is provided, which switches over between the small-signal signal path and the large-signal signal path. This enables a clean separation of the two signal paths, with the result that there is no undesired competition between the two signal paths.

Advantageously, a suppression module is provided, which is designed to suppress output signals of the large-signal signal path. Preferably, the small-signal signal path is not affected, i.e. its signals are passed on so that, to this extent, reactive power regulation continues. With the suppression of the large-signal signal path by the suppression module, a sudden change in the reactive power can be avoided, as could otherwise occur when the actual voltage moves out of the dead band. This means that there is no reactive power infeed in the case of values outside the dead band. This is particularly advantageous for wind turbines in distribution grids (voltage up to 110 kV). In this case, it is often desired to zero the current outside the dead band in order to avoid islanding until ultimately the fault has been cleared and the voltage rises again.

The invention further relates to a wind farm and to methods having the features as claimed in the second and third independent claims. For a more detailed explanation, reference is made to the above. A farm master of the wind farm is preferably designed such that setpoint values for the reactive power and/or voltage which are transmitted to a wind turbine operated outside the dead band are set by said farm master such that there is no steady-state deviation on return to the dead band.

BRIEF DESCRIPTION OF THE DRAWINGS

The invention will be explained in more detail with reference to an exemplary embodiment, which is illustrated in the drawings, in which.

DETAILED DESCRIPTION OF THE INVENTION

Figure 1:
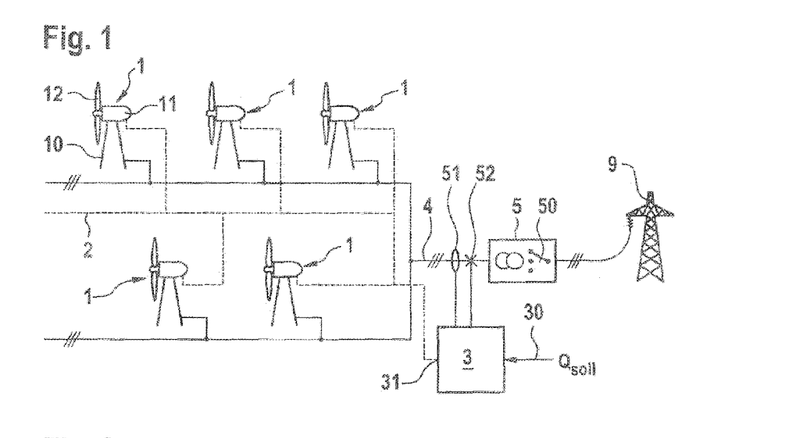
FIG. 1 shows a schematic illustration of a wind farm comprising a farm master and a wind turbine in accordance with one exemplary embodiment.

FIG. 1 illustrates an exemplary embodiment of a wind farm which comprises a plurality of wind turbines 1 in accordance with the invention and a farm master 3. The wind turbines 1 are connected to the farm master 3 via signal lines 2. Furthermore, the wind turbines 1 are connected to a farm-internal distribution grid 4, which is connected to an energy transmission grid 9, generally in the form of a high-voltage grid, via a tap-changing transformer 5. Sensors 51, 52 for output current and voltage (actual current and actual voltage) are arranged at the tap-changing transformer 5. the tap-changing transformer 5 has an automatic tap changer 51, which changes the transformation ratio of the tap-changing transformer 5 such that the voltage on the distribution grid 4 remains as constant as possible even in the case of fluctuations in the voltage on the transmission grid 9.

The farm master 3 is designed for the superordinate control of the individual wind turbines 1. It has an input 30 at which setpoint presets are applied as signals, in particular a signal for a setpoint reactive power $Q_{set}$, which signal is applied, for example, by a superordinate control entity, in particular the operator of the transmission grid 9 (alternatively other signals can also be used, for example those for the phase angle φ, the power factor cos φ, the ratio of active power to reactive power tan φ or a direct voltage preset). The farm master 3 determines from this a value for a setpoint voltage $U_{set}$, which is intended to be output in each case by the individual wind turbines 1, and transmits this setpoint voltage value $U_{set}$ to the respective wind turbine 1 via the signal lines 2, which is connected at an output 31 of the farm master 3. This signal for the setpoint voltage $U_{set}$ is further-processed by the individual wind turbines 1.

The individual wind turbines 1 are essentially constructed from a tower 10 and a nacelle 11 arranged pivotably in the azimuthal direction on the upper end of said tower, with a wind rotor 12 being arranged rotatably on the one side of said nacelle. Via a rotor shaft 13, said wind rotor drives a generator 14, which interacts with a converter 15 for generating electrical energy which is output via a connection line 17 connected to the distribution grid 4. The voltage at the respective wind turbine 1 is detected by means of a voltage sensor 18 arranged on the respective connection line 17. A converter controller 16, to which a regulator 72 of the wind turbine 1 is connected, is provided for controlling the converter 15.

Figure 2:
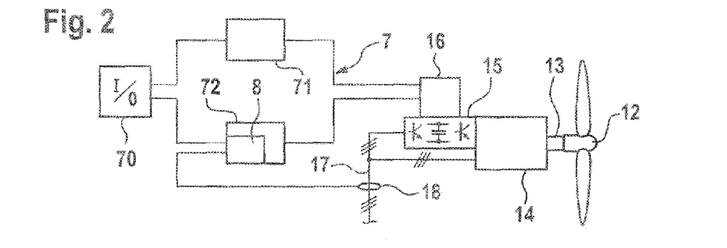
FIG. 2 shows a schematic illustration of a regulator having an additional module of the wind turbine in accordance with the exemplary embodiment illustrated in FIG. 1.

The regulator 72 is part of a control device 7 of the respective wind turbine 1. The control device 7 further comprises an input/output unit 70, which is connected to the grid from signal lines 2 and via which the control device 7 receives control signals which are output by the farm master 3 at its output 31, including the control signal for the setpoint voltage value $U_{set}$. Furthermore, the control device 7 comprises an operation controller 71. Said operation controller and the regulator 72 act with their output signal on the converter controller 16. The regulator 72 is designed for reactive power control, i.e. it outputs an output signal for a reactive power to be set by the converter to the converter controller 16 depending on the signal for the setpoint voltage $U_{set}$ applied at the inputs of said regulator and the actual voltage $U_{act}$ measured by the sensor 18. In the simplest case, this output signal is a droop; alternative embodiments are known per se and therefore do not need to be described in any further detail here.

Figure 3A:
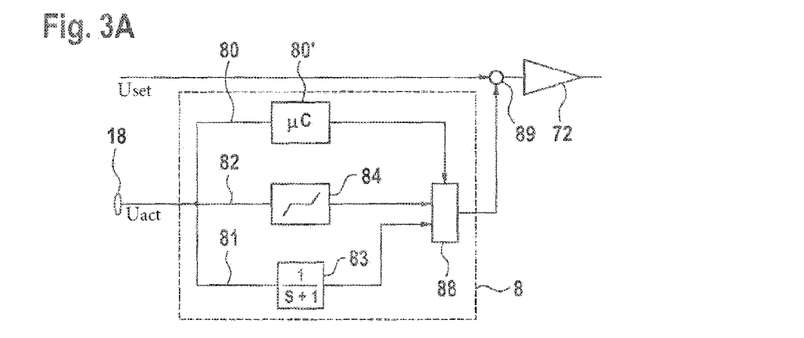
FIG. 3A, B show schematic illustrations for two alternative embodiments of the additional module.
Figure 3B:
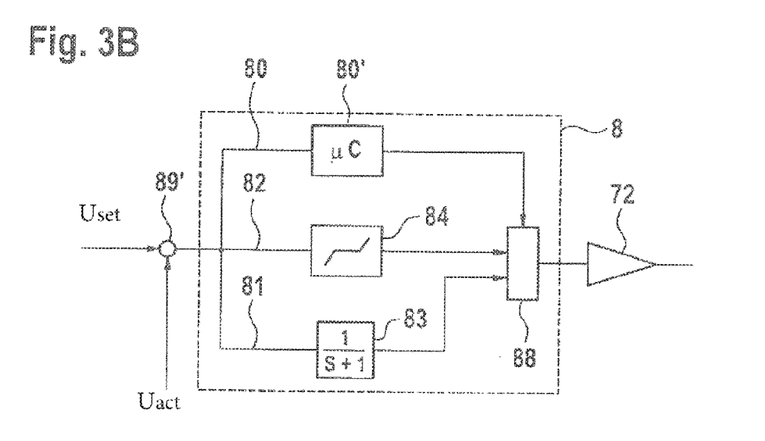

Furthermore, the regulator 72 is provided with an additional module 8 in accordance with the invention. The additional module has an input for the actual voltage $U_{act}$ and an output for a correction value, which are linked via a small-signal signal path 81 and a large-signal signal path 82, which are parallel to one another. Furthermore, a control path 80 with a control element 80' which acts on a change-over switch 88 is provided. Depending on the variant embodiment, a differentiating element 89, 89' is arranged upstream or downstream (see FIGS. 3A, 3B). A delay element 83, which is in the form of a low-pass filter in the exemplary embodiment illustrated, is arranged in the small-signal signal path 81. It will be mentioned that this can just as easily be a ramp element or another storage element with a memory for past values, for example a moving-average generator. A dead band element 84 is arranged in the large-signal signal path 82. It is designed such that it does not output an output signal in the case of an input signal within a central dead band, but does output an output signal which increases proportionally by a factor k in the case of an input signal outside this dead band. The output signals of the delay element 83 and of the dead band element 84 are applied to the switchover element 88. This is actuated by the control element 80'. Depending on the state of the control element 80' one of the two output signals, that of the small-signal signal path 81 with its delay element 83 or that of the large-signal signal path 82 with its dead band element 84, is output by the switchover element 88. However, the switchover element 88 is not essential. It is also possible for signal fusion of small-signal signal path 81 and large-signal signal path 82 to be performed. An example of a simple embodiment is a summation element 88' (see FIGS. 4 to 7).

The additional module 8 can be connected to the regulator 72 in two ways. Firstly, there may be a connection line on the input side for an actual variable, namely the actual voltage $U_{act}$ measured by the sensor 18 (see FIG. 3A). The output signal of the additional module 8 is then applied to the input of the regulator 72 via the differentiating element 89, with the setpoint voltage $U_{set}$ being applied to the other input thereof. Alternatively, the additional module 8 can also be arranged downstream of the differentiating element 89 (see FIG. 3B).

Figure 4:
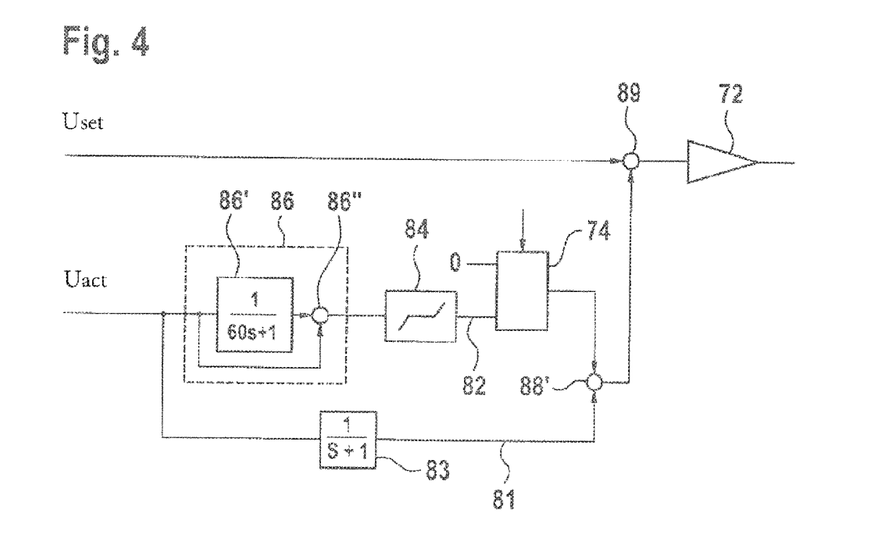
FIG. 4 shows a schematic view of an optional supplementation for the additional module.

Optionally, a tracking module 86 which is connected upstream of the dead band element 84 can be provided in the large-signal signal path 82. The tracking module 86 is preferably in the form of a so-called washout filter. Therefore, rapid changes in voltage, as occur in particular in the case of a short circuit, are directly passed on. At the same time, release from an average takes place, with the result that the dead band element 84 is kept without an average. It therefore has a full excursion both upwards towards a relatively high voltage and downwards towards a relatively low voltage. Therefore, with the tracking module 86, it is possible to respond rapidly to such changes more effectively and in a more targeted manner in the large-signal signal path 82, to be precise even when changes in the voltage level occur, for example owing to a switching operation at the tap changer 50. The tracking module 86 in the exemplary embodiment illustrated is in the form of a two-part washout filter, namely with actual filter core 86' in the form of a low-pass filter and a parallel branch linked via a downstream differentiating element 86".

Furthermore, a switchable suppression element 74 can be provided in the large-signal signal path 82. It can be switched over between two positions, namely a normal operation position and blocking position. In the normal operation position, the output signal of the dead band element 84 is connected, i.e. the suppression element is functionally transparent. In the blocking direction, on the other hand, the output signal of the dead band element 84 is ignored. This means that there is no longer a response to large changes, i.e. changes which pass through the large-signal signal path 82, with a change in the reactive power output. Small changes, i.e. changes which have passed through the small-signal signal path 81, are not affected by the suppression element 74, i.e. there continues to be a response to these changes by a change in the reactive power output. To this extent, therefore, there continues to be reactive power regulation.

Figure 5:
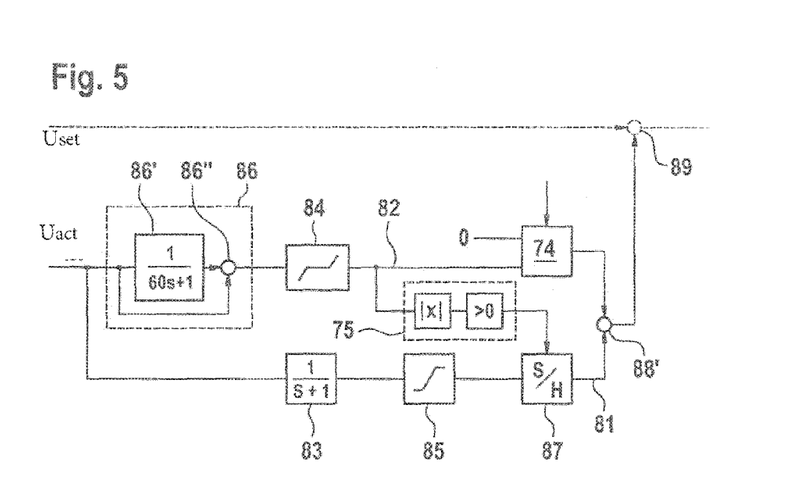
FIG. 5 shows a schematic illustration of a further optional supplementation for the additional module.

In accordance with a further option, a rate limitation element 85 is provided in the small-signal signal path 81. The rate limitation element 85 keeps the output of the storage element, embodied as a delay element 83, constant as long as the value thereof is outside a settable range (preferably corresponding to the width of the dead band). Excessive swings are thus prevented, with the result that the regulation overall can return more quickly back to the original values prior to the onset of the grid fault once the fault has been cleared. Furthermore, a holding element 87 is optionally arranged in the small-signal signal path 81. It is actuated via an actuation circuit 75 whenever the actual voltage $U_{act}$ measured by the voltage sensor 18 is outside the dead band. In this case, the output value of the small-signal signal path 81 is "frozen" at the most recently reached value by virtue of the holding element 87 outputting the most recently reached value as long as the actual voltage is outside the dead band. If the actual voltage returns back into the dead band, the holding element 87 is released and outputs the value which is present at its input again at its output. Therefore, an improved regulation behavior is achieved, in particular after clearance of a fault.

Figure 6:
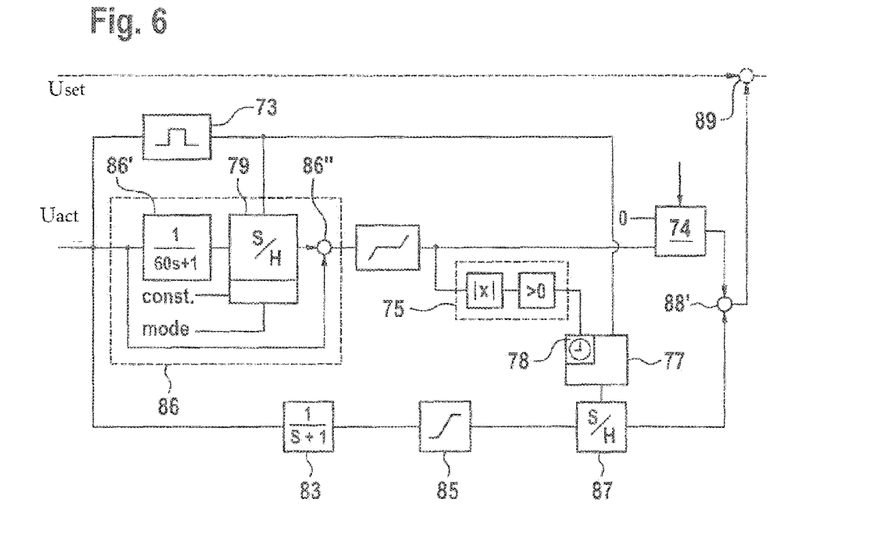
FIG. 6 shows a schematic illustration of optional monitoring of the working range.

FIG. 6 illustrates a further optional supplementation. It comprises a working range detector 73 for the converter 15. Said working range detector is designed to establish on the basis of the actual voltage and preset limit values $U_{min}$, $U_{max}$ whether the present voltage is still within the working range of the converter 15. If this is not the case, a corresponding fault signal is output by the detector 73. This fault signal is used for bringing the tracking module 86 and/or the storage element 85 to a standstill (with or without rate limitation element 87).

The working range detector 73 interacts with the tracking module 86 in the following way: a switchable holding element 79 is arranged on the tracking module 86. It is designed in the same way as the holding element 87, but additionally has an input for a fixed-value signal "const.". In addition, apart from its control connection to which the output signal of the working range detector 73 is connected, it has a further control connection "mode", which acts as mode selector. If the working range detector 73 outputs its fault signal, said fault signal is present at the control connection of the holding element 79, and the holding element 79, in its normal operating mode, stores the most recently applied value and then outputs this value. If in addition the further control connection "const." is activated, the holding element 79 does not output the most recently stored value but the fixed-value signal "const.". This means that, when there is a departure from the working range of the converter 15, the output signal of the filter core 86' is fixed, to be precise either to the most recently applied value or to the fixed value, depending on the operating mode.

In addition, the working range detector 73 acts on the storage element 83 or the rate limitation element 85 connected thereto. For this purpose, a combination switching element 77 is provided. It has two inputs and one output, wherein the output is active when at least one of the two input signals is effective. The fault signal is applied to a first input by the working range detector 73. This input is directly effective. The actuation circuit 75 is applied to a second input, which actuation circuit outputs a signal whenever the actual voltage $U_{act}$ is outside the dead band. The second input is indirectly effective, namely via a timing element 78, which effects an interruption after a presetable time period of 3 s, for example. With this embodiment of the combination switching element 77, a signal is output and is applied to the holding element 87, which then stores the most recently applied value in the manner already described above, (i) in the case of a departure from the working range of the converter 15 (identified by the working range detector 73) or (ii) in the case of a departure from the set dead band.

The most recently applied value is thus so to speak "frozen". In the latter case, i.e. in the case of a departure from the dead band, however, the timing element 78 effects an interruption after 3 s, with the result that there is no longer a signal output to the holding element 87. Said holding element then no longer stores but passes on the values present at its input directly to its output. With the last-mentioned case, consideration is given to the finding that, in the case of a departure from the dead band for more than 3 s, it can no longer be assumed that there is a conventional grid fault and therefore "freezing" provided for the grid fault case should be ended. The regulation of the wind turbine can then again be based on present signals.

Figure 7A:
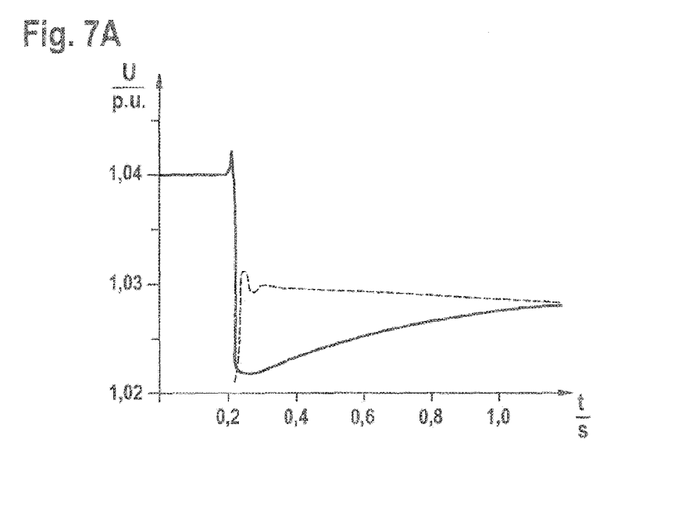
FIGS. 7A, B show characteristic curves for voltage and reactive power with and without the additional module.
Figure 7B:
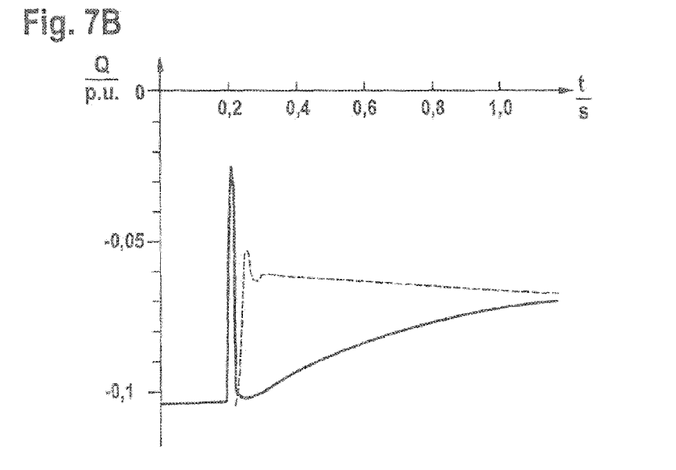

The operational behavior achieved by the regulator 7, reinforced by the additional module 8, in the event of a change in the actual voltage is illustrated in FIGS. 7A, B. FIG. 7A illustrates the profile of the actual voltage, and FIG. 7B illustrates the profile of the reactive power output. At time t=1 s, a change in the grid voltage by approximately 1.5% occurs, and correspondingly a switchover operation of the tap changer 51 occurs. The dashed line shows the behavior of a conventional regulation of the wind turbine. It can clearly be seen that the change in voltage results in a short pulse-like change in the reactive power infeed, wherein, directly after this, another reactive power level is set (see the slightly falling part of the dashed line for the reactive power in the time from t=1.05 s to t=1.9 s. The behavior changes with the additional module 8 according to the invention. Although there is always still a pulse-like reactive power infeed in the case of a change in voltage (see FIG. 6A, continuous line), the reactive power infeed returns, for example, to the potential present prior to the change in voltage after a short needle-shaped pulse in order from there to rise gradually (so as to match the changed actual voltage). An undesired immediate steady-state change in the reactive power infeed as a consequence of operation of the tap changer 51 alone is thus avoided.

The invention claimed is:

1. A wind turbine comprising a rotor, a generator driven by the rotor, a converter, and a control device comprising:
   an input for a control signal for the reactive power output,
   an input for the actually output voltage of the wind turbine,
   a regulator for the converter, wherein the regulator is configured to calculate, locally, a reactive power setpoint value for the wind turbine from the control signal for the reactive power output, and to correct the reactive power output by the wind turbine based on a comparison of the actually output voltage of the wind turbine with the control signal for the reactive power output, and
   an additional module, the additional module having separate small-signal and large-signal signal paths, wherein the small-signal signal path has an additional storage element in comparison with the large-signal signal path, the additional storage element storing previous state values of the small-signal signal path, wherein the regulator is configured to correct the reactive power output by the wind turbine based on outputs of the small-signal signal path and the large-signal signal path.

2. The wind turbine of claim 1, wherein a dead band element is arranged in the large-signal signal path.

3. The wind turbine of claim 1 wherein the additional module is connected upstream of the regulator.

4. The wind turbine of claim 3, wherein the additional module is connected to an input for an actual value of the regulator.

5. The wind turbine of claim 3, wherein the additional module is connected to an input for a setpoint value of the regulator.

6. The wind turbine of claim 1, wherein the small-signal signal path has a rate limitation element.

7. The wind turbine of claim 6, wherein the rate limitation element is combined with the storage element.

8. The wind turbine of claim 2, wherein the large-signal signal path comprises a tracking module interacting with the dead band element.

9. The wind turbine of claim 8, wherein the tracking module has a time constant which is at least an order of magnitude greater than a functional time constant of the small-signal signal path.

10. The wind turbine of claim 1 comprising a changeover which switches over between the small-signal signal path and the large-signal signal path.

11. The wind turbine of claim 1 comprising a suppression element which suppresses an output signal of the large-signal signal path.

12. The wind turbine of claim 1, comprising holding elements for one or both of the large-signal signal path and the small-signal signal path.

13. The wind turbine of claim 12, wherein the holding element for the large-signal signal path is actuated by a detector for the working range of the converter such that the holding element is activated when the converter is not in the working range.

14. The wind turbine of claim 12 wherein the holding element for the small-signal signal path is actuated by a control device in such a way that the holding element is activated when the converter is not in one or both of the dead band and the working range.

15. The wind turbine of claim 14, comprising a timing element which ends the activation of the holding element after a settable time period.

16. A wind farm comprising a plurality of wind turbines of claim 1 and a farm master.

17. The wind farm of claim 16, wherein the farm master is matched to the additional module such that upon operation of a wind turbine outside of a working range of the converter, the control value for the reactive power output is set to a preset value.

18. A method for operating a wind turbine comprising a rotor, a generator driven by the rotor, a converter, and a control device, the control device having an input for a control signal for the reactive power output and a regulator for the converter, the method comprising
    calculating, locally, a reactive power setpoint value for the wind turbine from the control signal for the reactive power output,
    detecting the actually output voltage of the wind turbine,
    comparing the detected voltage with the control signal,
    dividing a signal for the actual voltage at the wind turbine between a small-signal signal path and a large-signal signal path, wherein the small-signal signal path has an additional storage element in comparison with the large-signal signal path,
    storing previous state values of the small-signal signal path in the additional storage element of the small-signal signal path, and
    correcting the reactive power output by the wind turbine based on outputs of the small-signal signal path and the large-signal signal path.

19. The method of claim 18, wherein a dead band element is arranged in the large-signal signal path.

20. The wind turbine of claim 8, wherein the tracking module is connected upstream of the dead band element.

21. The wind turbine of claim 9, wherein the time constant is at least 50 times greater than a functional time constant of the small-signal signal path.

22. The wind turbine of claim 10, wherein the changeover switches over according to a switchover controller.

* * * * *